United States Patent
Caldeira et al.

(10) Patent No.: US 9,341,065 B2
(45) Date of Patent: May 17, 2016

(54) DUAL ELEMENT TURBINE BLADE

(71) Applicant: Elwha LLC, Bellevue, WA (US)

(72) Inventors: Kenneth G. Caldeira, Redwood City, CA (US); William D. Duncan, Mill Creek, WA (US); Bran Ferren, Beverly Hills, CA (US); William Gates, Medina, WA (US); W. Daniel Hillis, Encino, CA (US); Roderick A. Hyde, Redmond, WA (US); Muriel Y. Ishikawa, Livermore, CA (US); Edward K. Y. Jung, Bellevue, WA (US); Jordin T. Kare, San Jose, CA (US); John Latham, Boulder, CO (US); Nathan P. Myhrvold, Medina, WA (US); Stephen H. Salter, Edinburgh (GB); Clarence T. Tegreene, Mercer Island, WA (US); David B. Tuckerman, Lafayette, CA (US); Thomas A. Weaver, San Mateo, CA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/663,308

(22) Filed: Mar. 19, 2015

(65) Prior Publication Data

US 2015/0345312 A1    Dec. 3, 2015

Related U.S. Application Data

(63) Continuation of application No. 13/966,732, filed on Aug. 14, 2013.

(51) Int. Cl.
*F01D 5/14* (2006.01)
*F01D 5/28* (2006.01)

(52) U.S. Cl.
CPC ............... *F01D 5/147* (2013.01); *F01D 5/282* (2013.01); *F05D 2300/603* (2013.01); *Y10T 29/49339* (2015.01)

(58) Field of Classification Search
CPC ... F01D 5/147; F01D 5/282; F05D 2300/603; Y10T 29/49234; Y10T 29/49316; Y10T 29/49332; Y10T 29/49334; Y10T 29/49336; Y10T 29/49337; Y10T 29/49339; Y10T 29/49341; Y10T 29/49343
See application file for complete search history.

(56) References Cited

U.S. PATENT DOCUMENTS

| | | | |
|---|---|---|---|
| 709,402 | A | 9/1902 | Herndon |
| 2,479,057 | A | 8/1949 | Bodger |
| 3,378,228 | A | 4/1968 | Davies et al. |
| 3,844,727 | A | 10/1974 | Copley et al. |
| 3,844,728 | A | 10/1974 | Copley et al. |
| 4,065,903 | A | 1/1978 | Morley |
| 4,247,259 | A | 1/1981 | Saboe et al. |
| 4,314,794 | A | 2/1982 | Holden et al. |
| 4,473,336 | A | 9/1984 | Coney et al. |

(Continued)

*Primary Examiner* — Moshe Wilensky
(74) *Attorney, Agent, or Firm* — Foley & Lardner LLP

(57) ABSTRACT

A method of manufacturing a turbine blade includes providing a core element having a base portion, a tip portion, and an intermediate portion extending between the base portion and the tip portion. The intermediate portion has a non-uniform cross-section and is a high-strength fiber material. The method also includes surrounding the core element with a shell, the volume between the core element and the shell forming a void.

31 Claims, 7 Drawing Sheets

(56) References Cited

U.S. PATENT DOCUMENTS

| | | |
|---|---|---|
| 4,519,745 A | 5/1985 | Rosman et al. |
| 4,563,128 A | 1/1986 | Rossmann |
| 4,790,721 A | 12/1988 | Morris et al. |
| 5,947,181 A | 9/1999 | Davis |
| 6,197,424 B1 | 3/2001 | Morrison et al. |
| 6,451,416 B1 | 9/2002 | Holowczak et al. |
| 6,696,144 B2 | 2/2004 | Holowczak et al. |
| 7,080,971 B2 | 7/2006 | Wilson et al. |
| 7,736,131 B1 | 6/2010 | Wilson, Jr. |
| 2002/0155269 A1 | 10/2002 | Holowczak et al. |
| 2003/0175122 A1 | 9/2003 | Zhao et al. |
| 2005/0169759 A1 | 8/2005 | Haubert |
| 2006/0120869 A1 | 6/2006 | Wilson et al. |
| 2008/0310965 A1 | 12/2008 | Gerakis et al. |

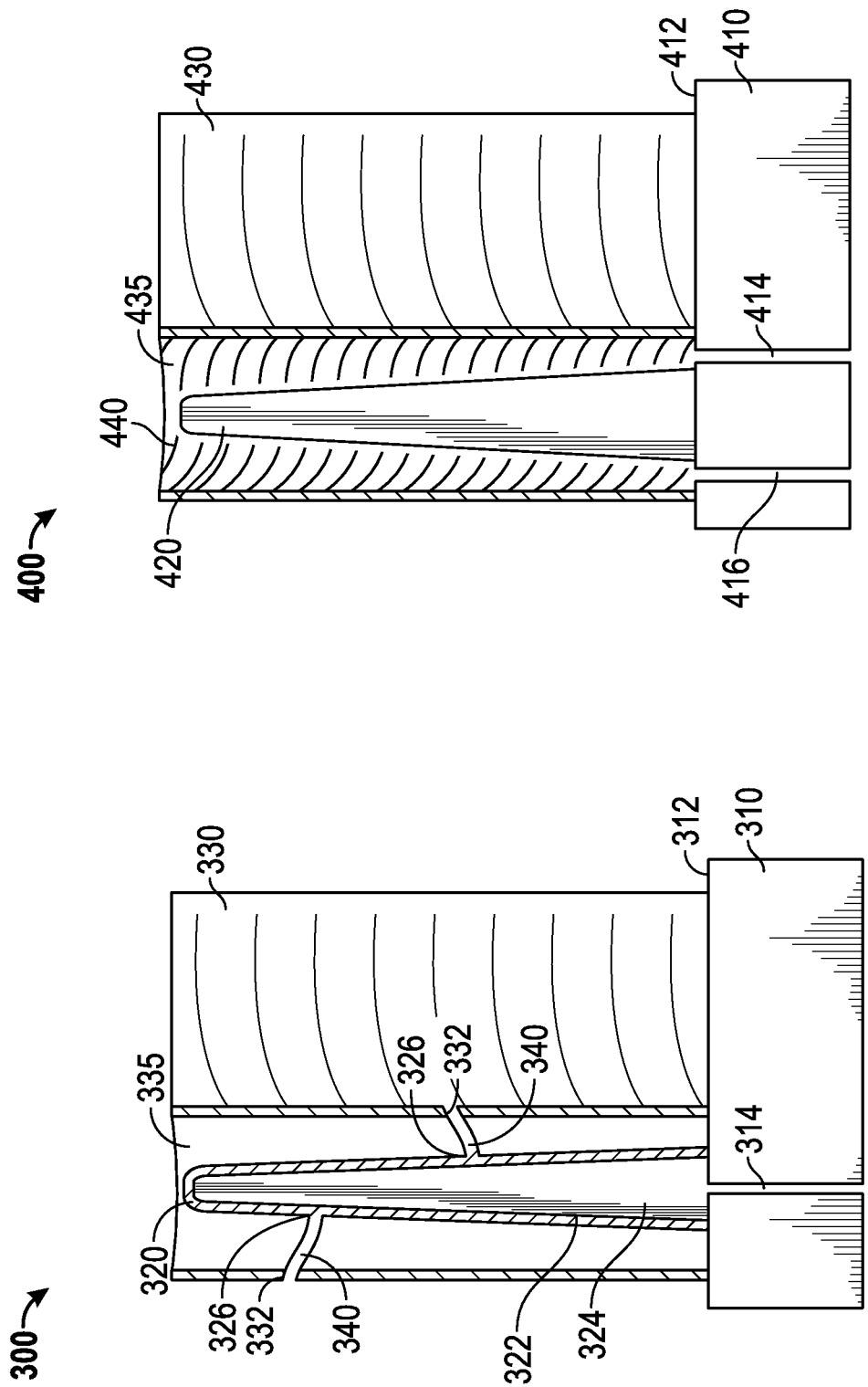

DUAL ELEMENT TURBINE BLADE

CROSS-REFERENCE TO RELATED PATENT APPLICATIONS

This application is a continuation of U.S. patent application Ser. No. 13/966,732, filed Aug. 14, 2013, which is incorporated herein by reference in its entirety.

BACKGROUND

Turbine engines are systems that convert energy within a fuel into mechanical energy (e.g., to move an aircraft, to turn an electrical generator, etc.). Turbine systems traditionally employ various turbine blades designed to extract energy from a high temperature, high pressure gas produced during a combustion reaction within the turbine engine. Often, turbine blades include a core and shell portion, which rotate at very high speeds around a central axis.

The high temperature and high speed operating conditions of turbine blades pose various design challenges for the manufacture of turbine blades. Such challenges include creep failure and failure due to fracture, among others. Creep and fracture may ultimately limit the useable life and the maximum operating temperature of the turbine blade thereby requiring replacement or repair, which may permanently or temporarily render the turbine engine inoperable. Where turbine blades are utilized in large-scale power generation facilities or in the jet turbine market, even limited inoperability may have a substantial impact on production, profitability, and revenue.

Turbine blade designers attempt to reduce creep failure and increase the maximum operating temperature using various methods. Foremost, turbine blades may include increased cross-sectional areas to reduce creep. Moreover, turbine blades may include various cooling passageways extending outward to a leading edge of the turbine blade to increase the maximum operating temperature of the turbine blade. Such passageways may facilitate emission of a fluid (e.g., air) that flows along the outer surface thereby further increasing the maximum operating temperature of the turbine blade.

SUMMARY

One embodiment relates to a method of manufacturing a turbine blade. The method includes providing a core element having a base portion, a tip portion, and an intermediate portion extending between the base portion and the tip portion. The intermediate portion has a non-uniform cross-section and is a high-strength fiber material. The method also includes surrounding the core element with a shell, a volume between the core element and the shell forming a void.

Another embodiment relates to a method of manufacturing a turbine blade. The method includes providing a core element having a base portion, a tip portion, and an intermediate portion extending between the base portion and the tip portion. The intermediate portion has a non-uniform cross-section and is a high-strength fiber material. The method also includes surrounding the core element with a shell, a volume between the core element and the shell forming a void, positioning a structural element within the void, and engaging the core element and the shell with the structural element.

Still another embodiment relates to a method of manufacturing a turbine blade. The method includes providing a core element having a base portion, a tip portion, and an intermediate portion extending between the base portion and the tip portion. The intermediate portion has a non-uniform cross-section and is a high-strength fiber material. The method also includes surrounding the core element with a shell, a volume between the core element and the shell forming a void, and extending a cooling element through the void, the cooling element configured to increase a maximum operating temperature at the turbine blade.

The invention is capable of other embodiments and of being carried out in various ways. Alternative exemplary embodiments relate to other features and combinations of features as may be generally recited in the claims.

BRIEF DESCRIPTION OF THE DRAWINGS

The skilled artisan will understand that the drawings primarily are for illustrative purposes and are not intended to limit the scope of the inventive subject matter described herein. In the drawings, like reference characters generally refer to like features (e.g., functionally similar and/or structurally similar elements).

FIG. 12 is a cross-sectional view of a turbine blade having a tapered core element and a thermal regulation system, according to an exemplary embodiment.

FIG. 13 is a cross-sectional view of a turbine blade having a tapered core element and a thermal regulation system, according to an exemplary embodiment.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Dual element turbine blades are intended to provide various advantages over single element turbine blade designs.

Such dual element turbine blades may be used in various turbine applications (e.g., a gas turbine, a wind turbine, a steam turbine, an oceanic turbine system, etc.). Specifically, the turbine blade includes a core element and a shell portion. The core element of the turbine blade is designed to carry the structural loads imparted on the turbine blade thereby reducing the structural loading that must be carried by the shell. Rather than carry structural loading, the shell performs aerodynamic functions and shields the core from exposure to high-temperature gasses. This configuration allows the core element and the shell portion to be designed with different materials. According to an exemplary embodiment, the core element is high-strength and operates at a relatively low temperature (e.g., 600 degrees Celsius) and the shell portion is lower-strength and operates at a relatively high temperature (e.g., 1,000 degrees Celsius). The core element may be manufactured from a material that is different from the shell portion. By way of example, the core element may be manufactured from a material optimized for high strength at low operating temperatures (e.g., a high-strength fiber material) and the shell portion may be manufactured from a material optimized for a highest maximum operating temperature. In some embodiments, the dual element turbine blade may operate at a greater temperature than traditional turbine blades thereby improving efficiency of the turbine engine. Such a non-structural shell portion may also have a reduced cross-sectional area or density. In some embodiments, the core element is coupled to the shell portion with structural elements. In other embodiments, cooling elements extend through a void between the core element and the shell portion. Such cooling elements may transfer energy from the shell portion to increase the maximum operating temperature of the turbine blade.

Figure 1:
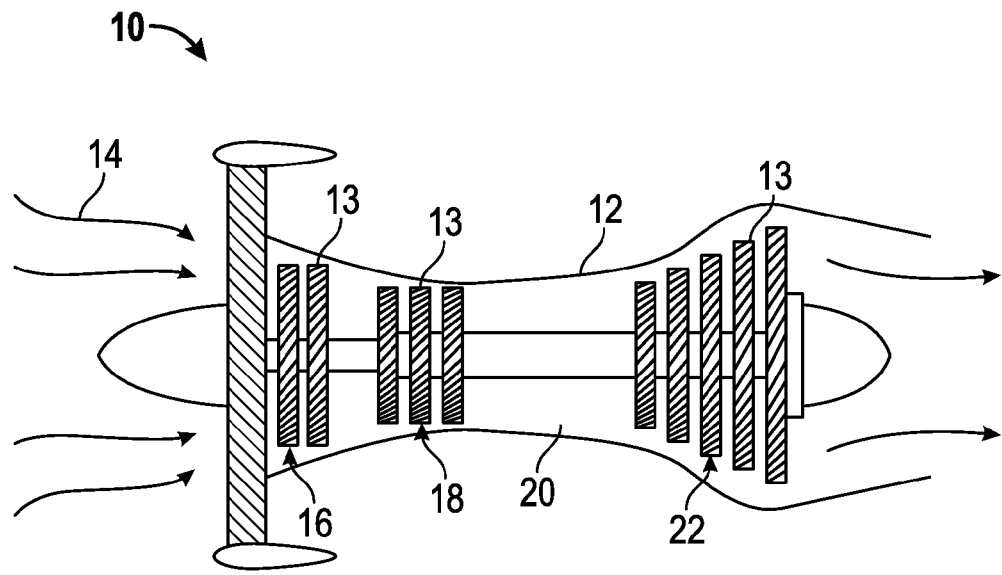
FIG. 1 is a schematic view of a turbine engine, according to an exemplary embodiment.

Referring first to the exemplary embodiment shown in FIG. 1, a turbine engine, shown as turbine engine 10, includes various sections. As shown in FIG. 1, turbine engine 10 includes a primary housing, shown as casing 12. An airflow, shown as airflow 14, travels through a front portion of turbine engine 10. As shown in FIG. 1, airflow 14 travels into the front portion of turbine engine 10 and through casing 12.

Referring still to the exemplary embodiment shown in FIG. 1, turbine engine 10 includes a low pressure compressor, shown as low pressure portion 16 and a high pressure compressor, shown as high pressure portion 18. In some embodiments, airflow 14 entering casing 12 is pressurized within low pressure portion 16 and further pressurized in high pressure portion 18. As shown in FIG. 1, turbine engine 10 also includes a combustion chamber, shown as chamber 20. High pressure air flow enters chamber 20 and may be thereafter combined with fuel prior to combustion. After the fuel-air mixture within chamber 20 combusts, airflow travels through a low pressure turbine, shown as exhaust section 22.

In some embodiments, various turbine blades, shown as blades 13, are disposed within low pressure portion 16, high pressure portion 18, and exhaust section 22. In some embodiments, blades 13 within each portion of turbine engine 10 are designed for the operating conditions within one of the low pressure portion 16, high pressure portion 18, and exhaust section 22. In some embodiments, blades 13 within exhaust section 22 experience higher operating temperatures and stresses than the blades 13 of low pressure portion 16 and high pressure portion 18. Specifically, blades 13 within exhaust section 22 are exposed to high temperatures due to the combustion of fuel and air within chamber 20. Such high temperatures pose additional design challenges for the manufacture of blades 13. While FIG. 1 shows an exemplary turbine engine, it should be understood that other types of turbine engines or turbine engines having more or fewer sections or numbers of blades may also utilize turbine blades that are exposed to adverse operating conditions.

Figure 2:
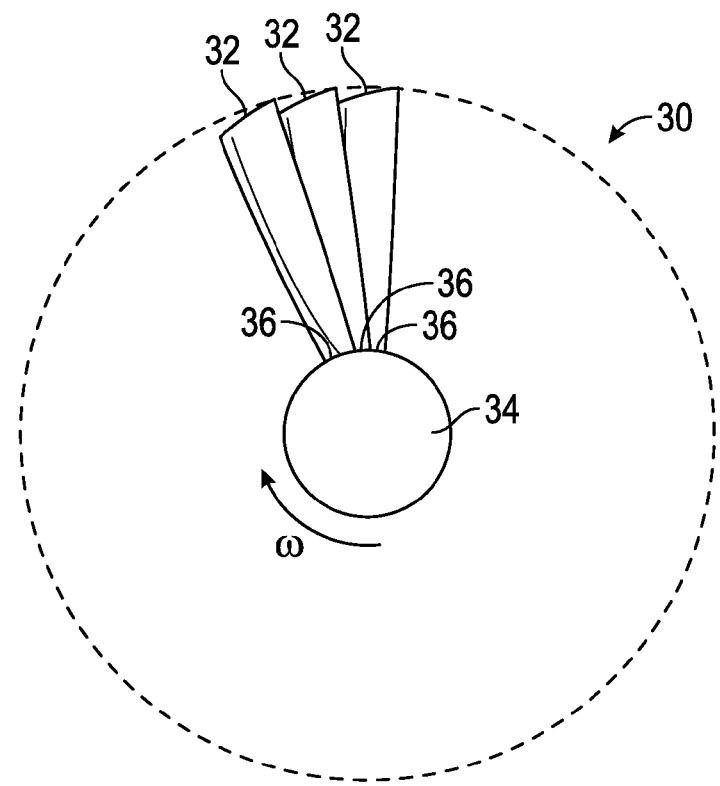
FIG. 2 is a schematic view of a turbine blade assembly, according to an exemplary embodiment.

Referring next to the exemplary embodiment shown in FIG. 2, a turbine blade assembly, shown as assembly 30, includes a plurality of turbine fin elements, shown as turbine blades 32. According to an exemplary embodiment, assembly 30 may be placed within one of the various sections within a turbine engine. As shown in FIG. 2, turbine blade 32 extends radially outward from a rotor hub, shown as hub 34. According to an exemplary embodiment, turbine blade 32 is coupled to hub 34 at an interface, shown as root 36. In some embodiments, turbine blades 32 may be shaped (e.g., with a leading edge, a center portion, and a trailing edge) to facilitate the extraction of energy from the exhaust gasses flowing through the turbine engine. It should be understood that assembly 30 may include a plurality of turbine blades 32 disposed radially around hub 34.

As shown in FIG. 2, assembly 30 is configured to rotate at an angular velocity, shown as w, about a centerline of hub 34. As assembly 30 rotates, turbine blades 32 are placed in tension due to centrifugal forces acting on turbine blades 32. In addition, the turbine blades 32 experience reaction forces associated with the combustion gasses that are relatively small compared to the centrifugal forces. Where the mass distribution is constant along the length of turbine blade 32, the force at root 36 is directly related to the density of the material, the cross-sectional area, the square of the angular velocity, and the squared length of turbine blade 32. Such a constant mass distribution may occur where, among other potential situations, the density and cross sectional area of the turbine blade 32 are constant along the length of turbine blade 32.

According to an alternative embodiment, the cross-sectional area of turbine blade 32 is not uniform along the length of turbine blade 32. By way of an extreme example, a turbine blade having a total mass positioned at its length from the axis of rotation will produce a greater centripetal force than a turbine blade having a uniform shape or a turbine blade having a total mass positioned more near to the axis of rotation. Such a distribution of mass along the length of the turbine blade may impact various characteristics of the turbine blade (e.g., likelihood of creep or fatigue failure, etc.). According to an exemplary embodiment, turbine blade 32 includes components (e.g., core element, shell portion, etc.) manufactured from materials having a preferred tensile strength to density ratio. Such a turbine blade 32 balances density with strength to carry tensile loading without magnifying the forces due to the rotating mass of turbine blade 32.

Figure 3:
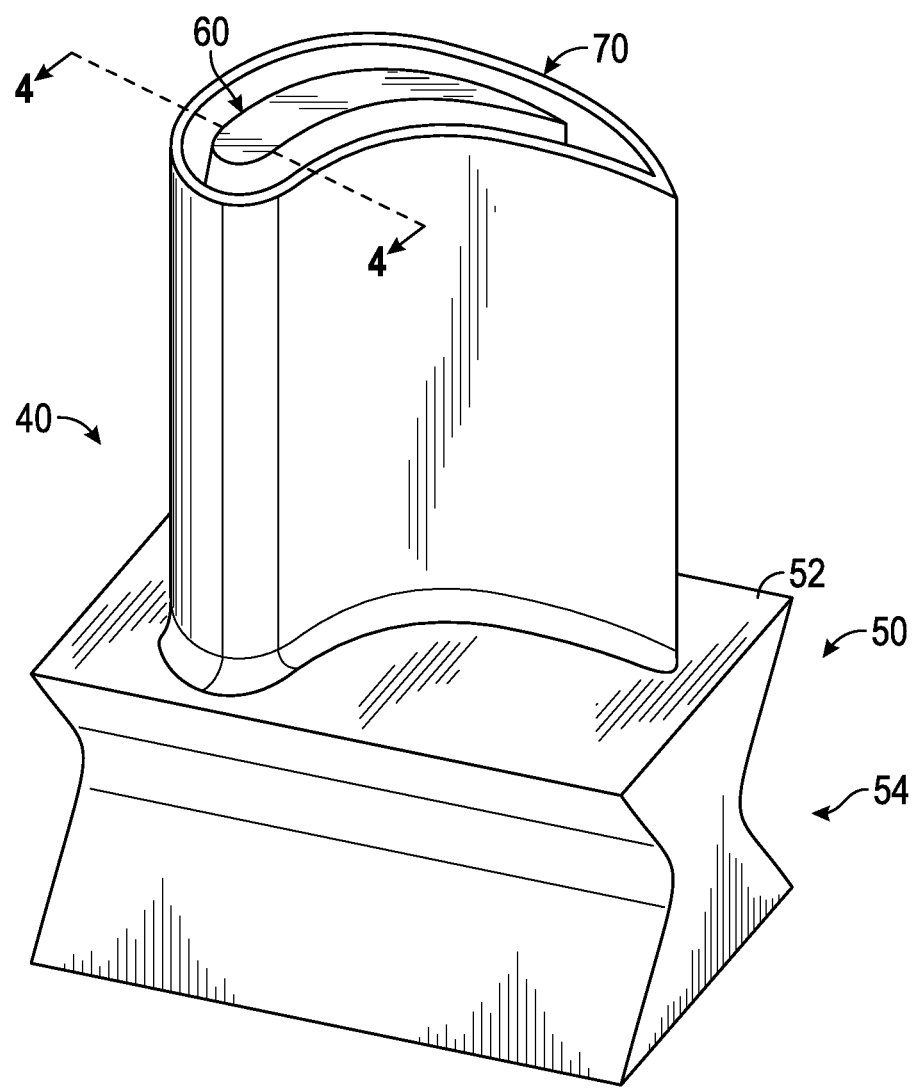
FIG. 3 is an elevation view of a turbine blade having a core element and a shell member, according to an exemplary embodiment.

Referring next to FIG. 3, a turbine blade 40 configured to operate within a turbine engine is shown, according to an exemplary embodiment. It should be understood that turbine blade 40 may be positioned within a turbine engine in a manner as discussed above or in still another configuration. In some embodiments, turbine blade 40 is configured to extract energy from an airflow.

As shown in FIG. 3, turbine blade 40 includes a base portion, shown as base member 50. According to an exemplary embodiment, turbine blade 40 includes a core element (e.g., structural element, shaft, pillar, etc.), shown as spine member 60. As shown in FIG. 3, spine member 60 is at least partially surrounded by a shell, shown as shell 70. As shown in FIG. 3, shell 70 extends along the length of spine member 60. According to an exemplary embodiment, spine member 60 is coupled to shell 70 with an end cap. Those skilled in the art will appreciate that the end cap may be coupled to the ends of spine member 60 and shell 70 and may apply compressive forces to the shell. Such applied compressive forces may be generated by placing the spine member 60 in tension. It should be understood that compressive forces applied to shell 70 increases the tensile loading that shell 70 may experience prior to failure.

According to an exemplary embodiment, base member 50 couples turbine blade 40 to the various other components of a turbine engine (e.g., the hub, etc.). In other embodiments, turbine blade 40 may not include a base member 50 and may be otherwise coupled within a turbine assembly (e.g., a gas turbine, etc.). As shown in FIG. 3, base member 50 includes an upper surface, shown as interface surface 52. In some embodiments, interface surface 52 extends as a flat plane. In other embodiments, interface surface 52 may have another shape configured to engage at least one of spine member 60 and shell 70.

Referring still to the exemplary embodiment shown in FIG. 3, base member 50 includes a retaining portion, shown as locking portion 54. In some embodiments, turbine blade 40 may rotate at high speeds within a turbine engine. In those embodiments, centripetal forces may overcome other types of fastening systems (e.g., a bolted connection, a welded connection, etc.). However, a turbine blade 40 having a locking portion 54 may engage (i.e. interface with) a mating aperture (i.e. slot, channel, etc.) within the hub.

According to the exemplary embodiment shown in FIG. 3, spine member 60 has a teardrop cross-sectional shape that tapers as it extends radially outward from base member 50. In other embodiments, spine member 60 has a uniform cross-section. Spine member 60 may alternatively have another shape (e.g., a rectangle, a "T" shape, various curved shapes, a shape created from various subcomponents, etc.). According to an exemplary embodiment, spine member 60 is tubular and includes at least one sidewall extending along the length of spine member 60 (e.g., to provide a tubular structure having improved strength in bending, etc.). In embodiments where spine member 60 is tubular, the sidewall may define an inner void (e.g., to allow a fluid to flow through spine member 60, etc.).

According to an exemplary embodiment, spine member 60 includes end portions configured to interface with base member 50. Such end portions may have different diameters, different shapes, different cross-sectional areas, or still other different features. In some embodiments, spine member 60 may be flexible (e.g., have a Young's modulus that is lower than the Young's modulus of at least one of base member 50 and shell 70). In other embodiments, spine member 60 may be a rigid structure.

According to an exemplary embodiment, spine member 60 is coupled (e.g., integrally formed, welded, adhesively secured, bolted, etc.) to base member 50. As shown in FIG. 3, spine member 60 structurally supports turbine blade 40. Loading from turbine blade 40 is transferred through base member 50 and into the hub or central shaft of the turbine engine. Such loading may be due to centripetal forces and relatively small bending forces due to the force of an airflow flowing across turbine blade 40.

Referring still to the exemplary embodiment shown in FIG. 3, spine member 60 may comprise various known materials. According to an exemplary embodiment, spine member 60 is a metal. According to an alternative embodiment, spine member 60 is manufactured from a high-strength fiber-based material (e.g., carbon fibers, polydioxanone or other polymer fibers, boron nitride fibers, ceramic fibers, nanotube fibers, etc.). According to still another alternative embodiment, spine member 60 includes fibers disposed within a matrix material (i.e. a composite). According to an exemplary embodiment, the fibers are arranged in at least one of a twisted, woven, and spun bundle. According to an alternative embodiment, the fibers may be otherwise disposed alongside one another.

Referring still to the exemplary embodiment shown in FIG. 3, shell 70 extends radially outward from base member 50. As shown in FIG. 3, shell 70 is fixed (e.g. integrally formed with, welded, adhesively secured, bolted, etc.) to base member 50. In other embodiments, shell 70 may otherwise interface with base member 50 (e.g., contact, slidably coupled with, rotatably coupled with, etc.). In still other embodiments, shell 70 may be isolated from base member 50.

As shown in FIG. 3, shell 70 at least partially surrounds (e.g., extends 360 degrees around the perimeter of) spine member 60. According to an exemplary embodiment, shell 70 has an airfoil shape designed to engage an airflow moving past turbine blade 40. In some embodiments, shell 70 includes a cross-section having a circularly shaped first end and a pointed second end. The circular first end may have sidewalls extending into a crescent shaped intermediate portion and toward the pointed second end. Such a configuration of walls may facilitate the ability of shell 70 to engage the airflow. In other embodiments, shell 70 may have another cross-sectional shape (e.g., elliptical, circular, etc.).

According to an exemplary embodiment, shell 70 comprises a material that is different from that of spine member 60. The material of shell 70 may be designed for high-temperature conditions. Shell 70 may comprise various materials (e.g., a metal, a non-metal, a metal-ceramic composite, a polymer, carbon fibers, polydioxanone or other polymer fibers, boron nitride fibers, ceramic fibers, nanotube fibers, etc.).

Referring still to the exemplary embodiment shown in FIG. 3, shell 70 is a tubular (i.e. hollow, empty, etc.) structure at least partially surrounding spine member 60. Such a shell 70 may include an inner surface and an outer surface separated by a sidewall. As discussed above, the outer surface of shell 70 may be subjected to high-temperature airflow from the exhaust gasses from a gas turbine engine. According to an exemplary embodiment, a void is formed between the inner surface of shell 70 and the outermost surface of spine member 60. In some embodiments, a void may be formed between an inner surface of shell 70, which may itself have a porous structure, and the mean surface of a porous spine member 60 (e.g., a nanotube product comprising a lattice structure).

According to an exemplary embodiment, shell 70 has a uniform cross-section (i.e. a cross-section that does not vary in shape or thickness along the length of shell 70). Such a shell 70 may have a constant wall thickness (e.g., 0.25 inches, 0.5 inches, etc.). In other embodiments, shell 70 has a non-uniform cross-section. Such a shell 70 may have a wall thickness or cross-sectional shape that varies along the length of shell 70 (e.g., the wall thickness may decrease along the length of shell 70).

Figure 4:
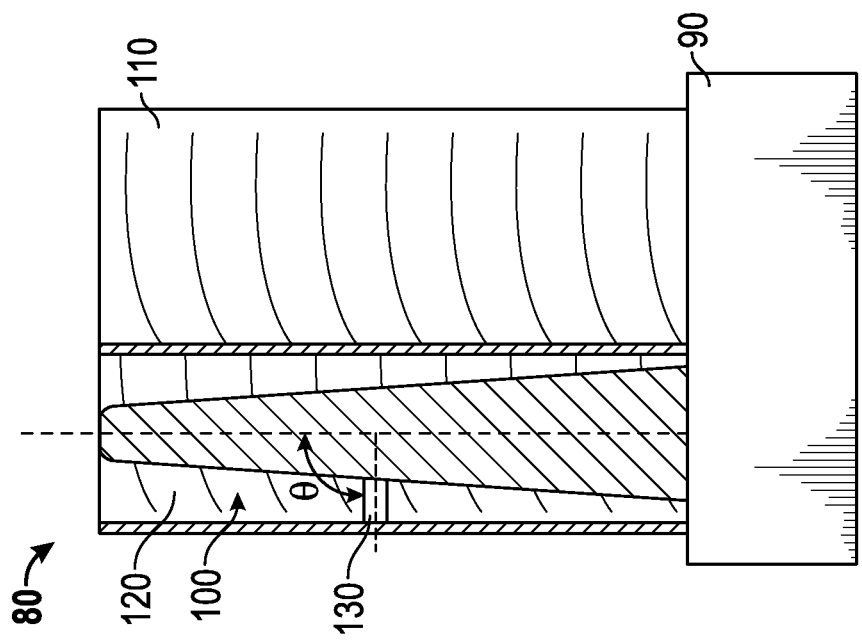
FIG. 4 is a cross-sectional view of a turbine blade having a tapered core element, according to an exemplary embodiment.

Referring next to the exemplary embodiment of FIG. 4, a sectional view of turbine blade 40 is shown. As shown in FIG. 4, turbine blade 40 includes a shell 70 at least partially surrounding spine member 60. According to an exemplary embodiment, spine member 60 extends orthogonally from interface surface 52 of base member 50.

According to an exemplary embodiment, spine member 60 includes a non-uniform cross-section. As shown in FIG. 4, spine member 60 includes a lower portion (i.e. base portion, coupling portion, etc.) shown as root end 62 and an upper portion end (i.e. tip portion, opposing portion, etc.) shown as cap end 64. In some embodiments, spine member 60 includes a central region (i.e. intermediate portion, etc.), shown as body portion 66. Body portion 66 is defined as the region of spine member 60 between root end 62 and cap end 64.

As shown in FIG. 4, spine member 60 has a tapered shape extending from base member 50. Such a tapered spine member 60 may have a teardrop shaped cross-section. According to an exemplary embodiment, cap end 64 of spine member 60 includes a smaller cross-sectional area than root end 62 of spine member 60. In other embodiments, spine member 60 is otherwise shaped but tapers (i.e. narrows, decreases, decreases in at least one of cross-sectional area and density of the material) between root end 62 and cap end 64.

According to an alternative embodiment, a turbine blade includes a plurality of core elements (i.e. at least two). Such a plurality of core elements may be arranged in various configurations (e.g., parallel to one another, angularly offset relative to one another, one within the other, etc.). In some embodiments, the plurality of core elements may not extend along straight lines (e.g., the plurality of core elements may be arranged in a woven configuration, a non-woven configuration, a curved configuration, or in still another configuration). The plurality of core elements may carry structural loading of a turbine blade. Such a plurality of core elements may be oriented to carry rotational loading or loading due to other forces (e.g., bending forces, etc.).

Figure 5:
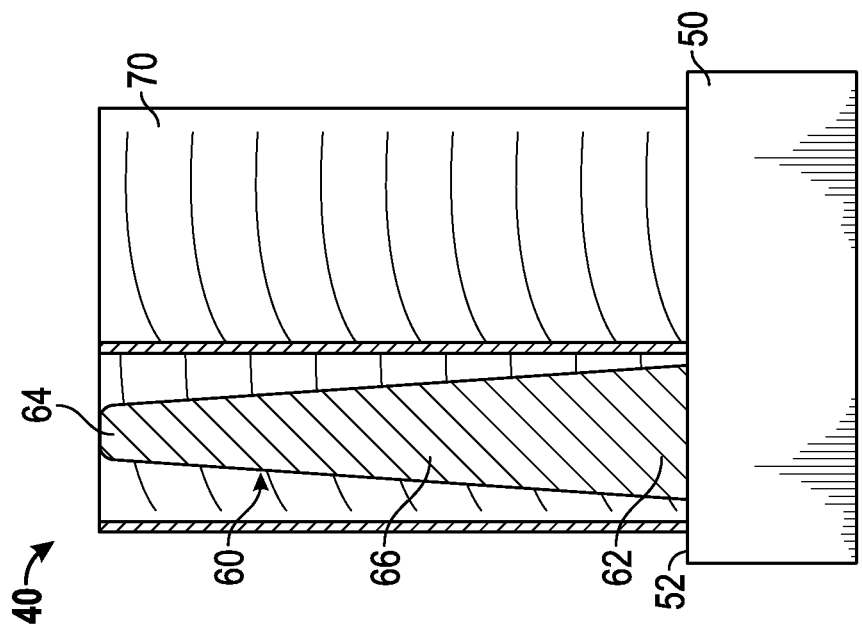
FIG. 5 is a cross-sectional view of a turbine blade having a tapered core element and a support member, according to an exemplary embodiment.
Figure 6:
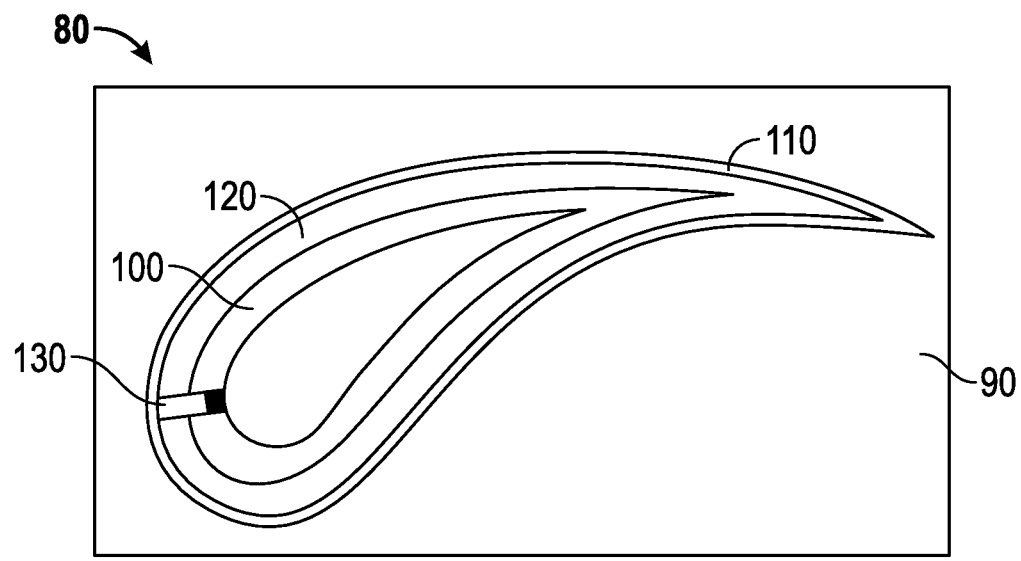
FIG. 6 is a cross-sectional view of a turbine blade having a tapered core element and a support member, according to an exemplary embodiment.

Referring next to the exemplary embodiment shown in FIGS. 5-6, a turbine fin element, shown as turbine blade 80 includes a base portion, shown as base member 90. According to an exemplary embodiment, turbine blade 80 includes a core element, shown as spine member 100. As shown in FIGS. 5-6, spine member 100 includes a non-uniform cross-section. In some embodiments, spine member 100 is at least partially surrounded by a casing, shown as shell 110. A portion of shell 110 is hidden in FIG. 5 to expose spine member 100. As shown in FIG. 5, shell 110 extends along the length of spine member 100. According to an exemplary embodiment, spine member 100 is coupled to shell 110 with an end cap.

According to the exemplary embodiment shown in the cross-sectional view of FIG. 5 and the top view of FIG. 6, shell 110 may comprise a hollow structure. As shown in FIGS. 5-6, shell 110 includes an inner surface and an outer surface separated by a sidewall. According to the exemplary embodiment shown in FIGS. 5-6, spine member 100 includes an outer surface, and a void space, shown as void 120, is formed between the outer surface of spine member 100 and the inner surface of shell 110.

Referring still to the exemplary embodiments shown in FIGS. 5-6, turbine blade 80 includes a structural element, shown as support 130, extending through void 120. In some embodiments, support 130 is configured to couple (e.g., attach, fix, adjoin, etc.) spine member 100 and shell 110. As shown in FIG. 5, support 130 has a circular cross-section. In other embodiments, support 130 is otherwise shaped. While turbine blade 80 is shown in FIGS. 5-6 to include a single support 130, turbine blade 80 may include a plurality of supports 130, according to various alternative embodiments. Such supports may be evenly distributed around spine member 100 or may be otherwise positioned within void 120 (e.g., positioned along a single side of spine member 100, randomly distributed, etc.). According to an alternative embodiment, support 130 may include a cross-section having a rectangular or hexagonal shape. According to still other alternative embodiments, support 130 may have a tubular shape (e.g., to provide enhanced resistance to bending stresses). In some embodiments, support 130 is flexible (e.g., a higher young's modulus than spine member 100). In other embodiments, support 130 is a rigid structure. In some embodiments, support 130 may be configured to apply compressive forces on shell 110. In other embodiments, support 130 is configured to transfer loading applied to shell 110 to spine member 100.

According to an exemplary embodiment, support 130 is configured to structurally couple spine member 100 and shell 110. In some embodiments, an interface is formed at the boundary between support 130 with spine member 100 and shell 110. Such an interface may comprise an adhesive material disposed between support 130 and at least one of spine member 100 and shell 110. In other embodiments, the interface may be formed at the welded interface, the cross-linked boundary, or another joint between support 130 and at last one of spine member 100 and shell 110. According to an exemplary embodiment, the interface portion extends around the periphery of support 130 (e.g., to more completely secure support 130 to at least one of spine member 100 and shell 110).

As shown in FIGS. 5-6, support 130 is coupled to a central region (i.e. intermediate portion, etc.) of spine member 100. In some embodiments, support 130 may be coupled to another portion of spine member 100 (e.g., a portion of spine member 100 proximate base member 90, etc.). According to an exemplary embodiment, support 130 extends laterally away from a centerline of spine member 100 along an extension axis.

In some embodiments, an offset angle, shown as offset angle $\theta$, is defined between the centerline of spine member 100 and the extension axis of support 130. In other embodiments, offset angle $\theta$ may be defined between the outer surface of spine member 100 (e.g., the surface of spine member 100 exposed to void 120) and the extension axis of support 130. As shown in FIG. 5, the offset angle $\theta$ is approximately 90 degrees. In other embodiments, the offset angle $\theta$ may be less than 90 degrees. In still other embodiments, at least one of support 130 and spine member 100 do not extend in a linear direction (i.e. support 130 or spine member 100 may have a curved shape). Such a non-linear support 130 or spine member 100 may be otherwise positioned within void 120.

Figure 7:
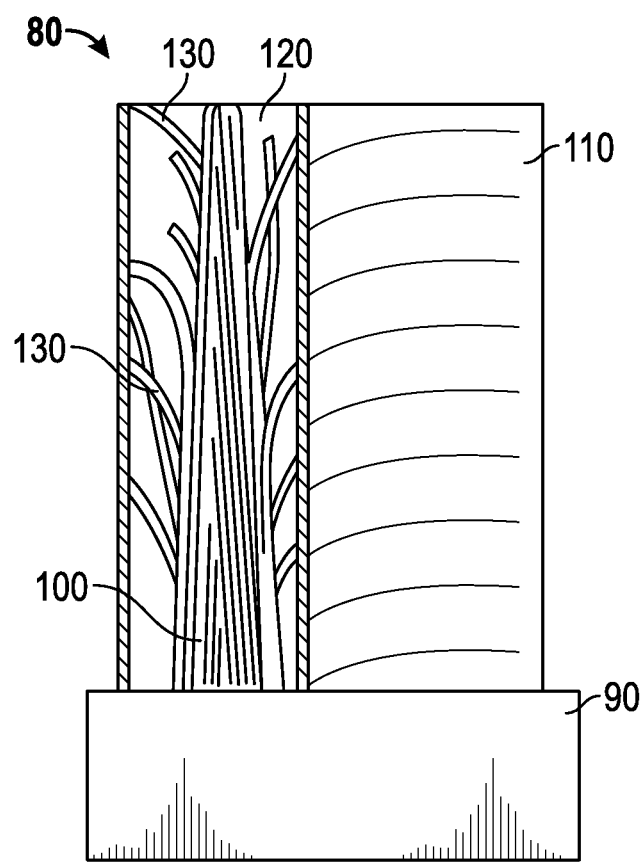
FIG. 7 is a cross-sectional view of a turbine blade having a tapered core element and a support member, according to an exemplary embodiment.

Referring next to the embodiment shown in FIG. 7, turbine blade 80 includes shell 110 coupled to spine member 100 with a plurality of supports 130. According to an exemplary embodiment, spine member 100 includes a plurality of individual high-strength fibers (e.g., carbon fibers, polydioxanone or other polymer fibers, boron nitride fibers, nanotube fibers, etc.). As shown in FIG. 7, a portion of such high-strength fibers peel off of spine member 100 and engage shell 110 to form the plurality of supports 130. According to the exemplary embodiment shown in FIG. 7, the supports 130 are arcuate and may each have a different shape. The supports 130 may be shaped with a constant radius (e.g., as part of a circle) or with a radius that changes along the length of supports 130 (e.g., as part of an ellipse). The supports 130 may alternatively have a uniform shape. In other embodiments, the high-strength fibers otherwise extend laterally outward from a centerline of spine member 100 to form supports 130 (e.g., perpendicularly, at a constant angle, etc.). According to an alternative embodiment, supports 130 are high-strength fibers coupled (e.g., molecularly cross-linked, adhesively secured, etc.) to a non-fibrous spine member 100 (e.g., manufactured from a solid material). Supports 130 couple spine member 100 and shell 110. According to an exemplary embodiment, supports 130 are initially loaded in tension to generate compressive stresses within shell 110.

Figure 8:
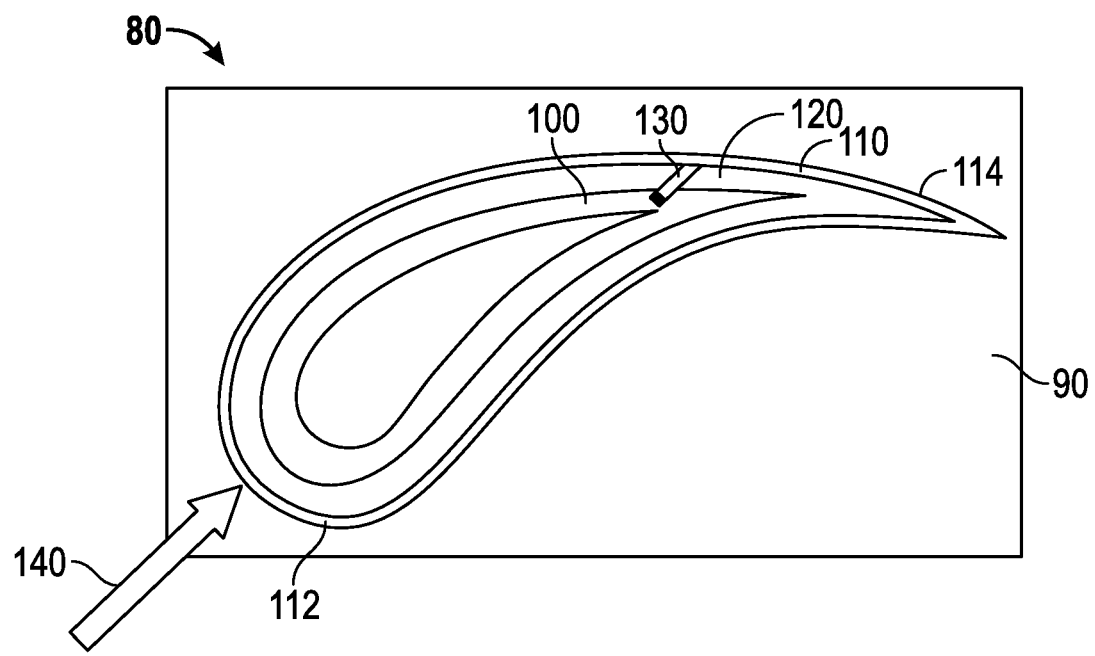
FIG. 8 is a cross-sectional view of a turbine blade having a tapered core element and a support member, according to an exemplary embodiment.

Referring next to the alternative embodiment shown in FIG. 8, turbine blade 80 may experience loading due to air flowing through a turbine engine. Such an airflow may apply a force, shown as aerodynamic load 140, on shell 110. Such forces on shell 110 may be relatively small in comparison to the centrifugal forces generated due to the rotation of turbine blade 80. In embodiments where shell 110 is coupled to base member 90, a portion of aerodynamic load 140 may be transferred to base member 90 through an interface (e.g., bolted connection, welded portion, etc.). According to an alternative embodiment, shell 110 is isolated from base member 90. Such a shell 110 may transfer the entirety of aerodynamic load 140 to spine member 100 through at least one support 130. While shown in FIG. 8 as having a single support 130, it should be understood that turbine blade 80 may include a plurality of supports 130 to reduce the forces imparted on a single support 130. Such supports 130 may be arranged within a line (e.g., extending within a common plane from spine member 100), may be arranged within several lines (e.g., extending within several planes from spine member 100), or may be otherwise arranged (e.g., randomly, etc.). Turbine blade 80 may alternatively include supports 130 configured to transfer aerodynamic load 140 and supports 130 to apply compressive loading to shell 110.

As shown in FIG. 8, turbine blade 80 includes a support 130 positioned along the direction of aerodynamic load 140. According to an exemplary embodiment, aerodynamic load 140 interacts with a first side, shown as intake side 112, of shell 110. As shown in FIG. 8, shell 110 also includes a second side, shown as exhaust side 114. While this discussion illustrates an exemplary embodiment of shell 110 configured to interact with an aerodynamic load 140 along an intake side 112, it should be understood that other turbine fins may experience other load cases or may be otherwise shaped. Supports 130 may be positioned within such turbine fins to carry the loading.

Referring still to the exemplary embodiment shown in FIG. 8, support 130 of turbine blade 80 is aligned with the direction of aerodynamic load 140. As shown in FIG. 8, support 130 is coupled to spine member 100 and exhaust side 114 of shell 110. Such a support 130 may experience only tensile stresses and may transfer aerodynamic load 140 from shell 110 to spine member 100. In some embodiments, support 130 may be manufactured from a flexible material or a material designed to withstand large tensile stresses. According to an exemplary embodiment, support 130 is manufactured from a fiber material (e.g., carbon fiber, a nanotube, boron nitride fiber, etc.). Those skilled in the art will understand that such fibrous materials may have a large tensile strength. According to an exemplary embodiment, turbine blade 80 having support 130 coupled to exhaust side 114 of shell 110 and placed in tension is designed to employ the large tensile strength of support 130.

Figure 9:
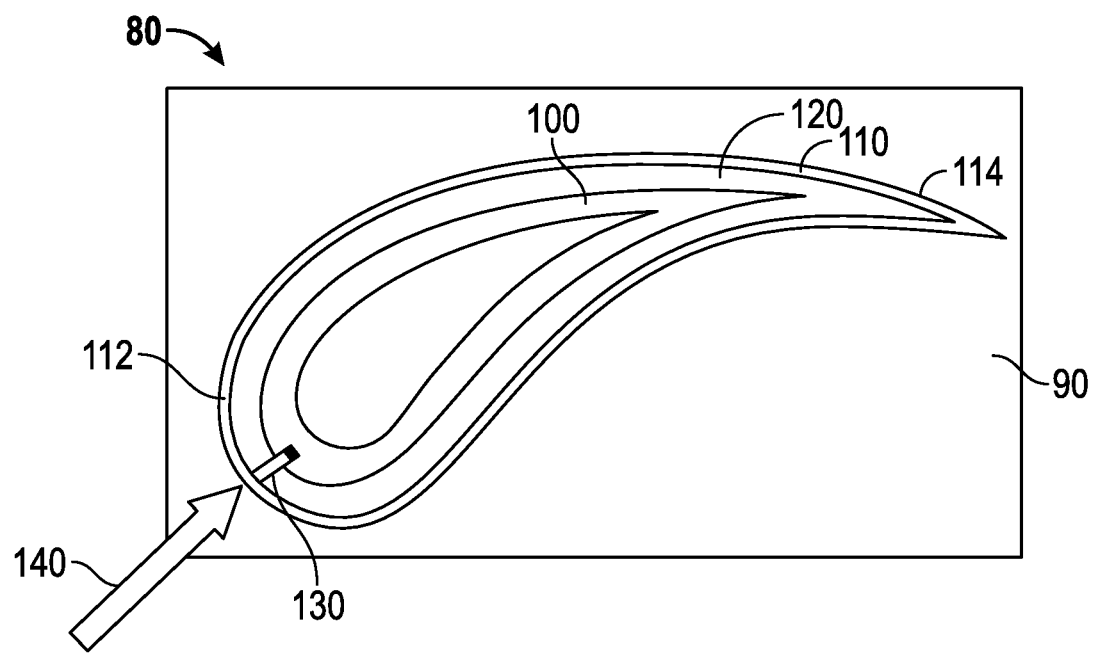
FIG. 9 is a cross-sectional view of a turbine blade having a tapered core element and a support member, according to an exemplary embodiment.

Referring next to the alternative embodiment shown in FIG. 9, support 130 of turbine blade 80 is aligned with the direction of aerodynamic load 140. As discussed above, support 130 may transfer aerodynamic load 140 from shell 110 to spine member 100. As shown in FIG. 9, support 130 is coupled to spine member 100 and to intake side 112 of shell 110. Where aerodynamic load 140 acts on shell 110 in the direction indicated in FIG. 9 (i.e. toward intake side 112 of shell 110), support 130 may be placed in compression and experience compressive forces.

In some embodiments, support 130 may have a shape configured to facilitate the transmission of aerodynamic load 140 from shell 110 to spine member 100. By way of example, support 130 may have a large area moment of inertia (e.g., a tubular structure) to prevent buckling. As shown in FIG. 9, support 130 has a circular cross-section. In other embodiments, support 130 has another shape. Regardless of the cross-sectional shape, support 130 may be manufactured from a material having a large compressive strength (i.e. a material capable of withstanding large compressive loading without buckling). Under the loading conditions shown in FIG. 9, support 130 may experience only compressive loading. Such a load case may allow for the selection of materials particularly suited for compressive loading and may allow for the use of materials that may exhibit lower tensile strengths (e.g., a ceramic material, other brittle materials, etc.).

Figure 10:
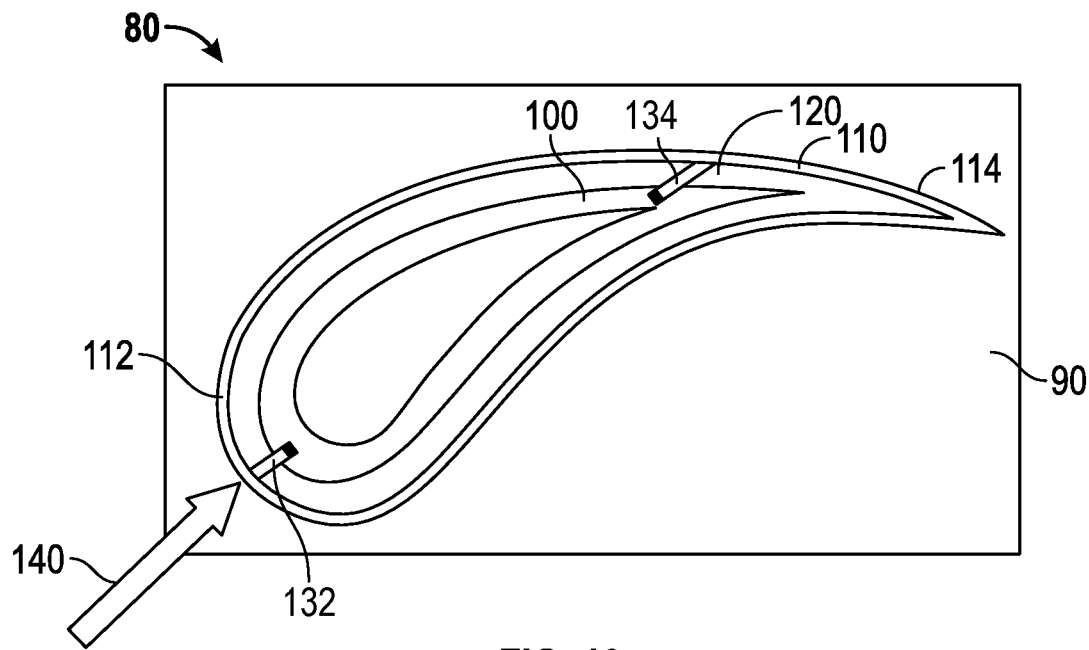
FIG. 10 is a cross-sectional view of a turbine blade having a tapered core element and a support member, according to an exemplary embodiment.

Referring next to the exemplary embodiment shown in FIG. 10, turbine blade 80 includes a first structural member, shown as support 132, and a second structural support, shown as support 134. As shown in FIG. 10, support 132 is coupled to intake side 112 of shell 110 and support 134 is coupled to exhaust side 114 of shell 110. According to an exemplary embodiment, support 132 and support 134 are each also coupled to spine member 100. In some embodiments, support 132 and support 134 may be manufactured from the same material. Where turbine blade 80 experiences aerodynamic load 140, a material for support 132 and support 134 may have large compressive and tensile strengths (e.g., a metal, etc.).

In other embodiments support 132 may be manufactured from a first material (e.g., a material having a large compressive strength) and support 134 may be manufactured from a second material (e.g., a material having a large tensile strength). Such a configuration may promote efficient loading of spine member 100 through the selection of materials specifically suited for loading in a particular portion of turbine blade 80. According to an exemplary embodiment, the selection of location specific material may reduce the cross-sectional area of the supports 130 within void 120 of turbine blade 80. Such a reduction in cross-sectional area may reduce the mass of turbine blade 80 that is positioned away from the base portion thereby reducing the root forces and mass moment of inertia, as discussed above.

According to various other alternative embodiments, a turbine blade may include a plurality of support members. Such support members may extend laterally between the core element and the shell, may extend at an angle relative to the core element, or may otherwise couple the core element to the shell. The support members may couple the core element to the shell in various locations. Such locations may include at least one of near the root of the turbine blade, near the tip or cap end of the turbine blade, or along a central region of the turbine blade. The support members may extend along a linear direction or may be curved (e.g., to differentially distribute an aerodynamic load relative to linear support members). In other embodiments, a turbine blade may include support members extending between portions of the shell (e.g., to prevent compression of the tubular shell structure). In still other embodiments, various support members may be coupled to other support members to form a network or matrix support unit.

According to still another alternative embodiment, the shell may be otherwise coupled to the core element. By way of example, the void formed between the inner surface of the shell and the outer surface of the core element may be at least partially filled with a material. According to an exemplary embodiment, filling the void with a material couples the entire length of the core element to the shell. In some embodiments, the void may be filled with materials having a lower density at the tip of the turbine blade. Such a configuration may reduce the mass moment of inertia for the turbine blade by reducing the mass of the turbine blade radially offset from the turbine blade root. According to an exemplary embodiment, the void is filled with a metal. According to various alternative embodiments, the void may be filled with a synthetic, a composite, a plurality of nanotube elements disposed within a binder, a foam material, or filled with another material.

Figure 11:
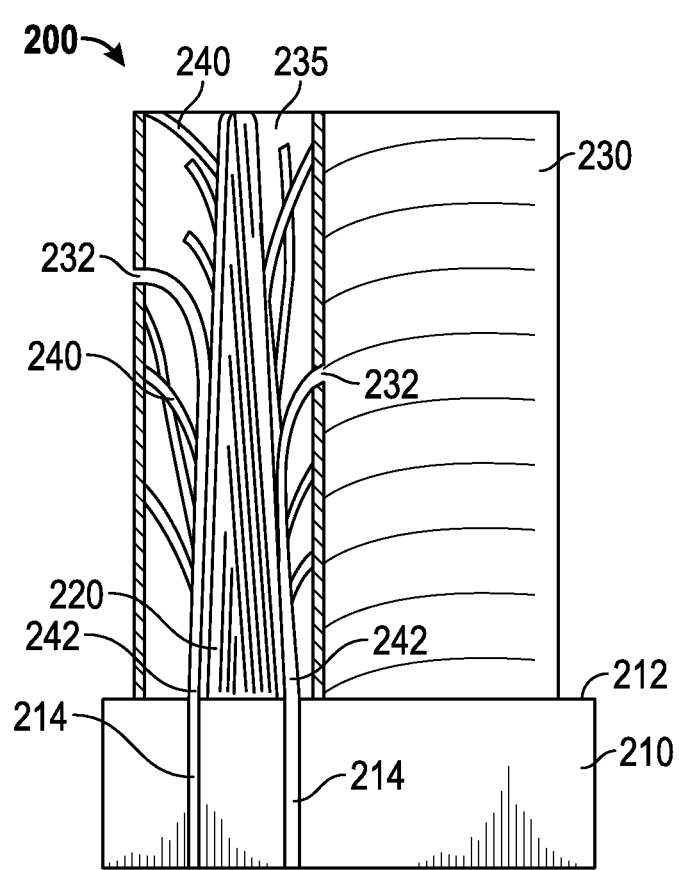
FIG. 11 is a cross-sectional view of a turbine blade having a tapered core element and a thermal regulation system, according to an exemplary embodiment.

Referring next to FIGS. 11-13, turbine blades having a thermal regulation system are shown, according to various alternative embodiments. As discussed above, various turbine blades may be located within a gas turbine engine downstream of a combustion chamber. Due to the release of thermal energy during combustion, such turbine blades may be exposed to a high temperature airflow. A turbine blade having a thermal regulation system may have a greater maximum operating temperature relative to traditional turbine blades thereby increasing the efficiency of the turbine engine.

According to the exemplary embodiment shown in FIG. 11, a turbine blade 200 includes a thermal regulation system originating from a base portion, shown as base portion 210. In some embodiments, base portion 210 includes a planar surface, shown as surface 212. According to an exemplary embodiment, turbine blade 200 includes a core element, shown as spine member 220 and a shell, shown as shell 230. As shown in FIG. 11, spine member 220 and shell 230 extend orthogonally from surface 212. In some embodiments, a void, shown as void 235, is defined by the volume between an inner surface of shell 230 and an outer surface of spine member 220.

Referring still to FIG. 11, base portion 210 defines a plurality of apertures, shown as base cooling apertures 214. According to an exemplary embodiment, turbine blade 200 includes a plurality of cooling elements, shown as cooling elements 240. As shown in FIG. 11, cooling elements 240 are positioned within void 235 between shell 230 and spine member 220. Cooling elements 240 are configured to increase the maximum operating temperature of shell 230. In some embodiments, cooling elements 240 are tubular members configured to also apply forces on shell 230 (e.g., to produce compressive stresses). According to an exemplary embodiment, each of the plurality of cooling elements 240 includes a first end, shown as root end 242 and a second end, shown as distal end 244. In some embodiments, root end 242 is coupled to base portion 210 of turbine blade 200. As shown in FIG. 11, shell 230 defines a plurality of apertures, shown as shell cooling apertures 232. In some embodiments, cooling elements 240 couple base cooling apertures 214 to shell cooling apertures 232. By way of example, distal ends 244 of cooling elements 240 may be coupled to shell 230 and positioned over shell cooling apertures 232. Root ends 242 of cooling elements 240 may be similarly coupled to base portion 210 and positioned over base cooling apertures 214. In other embodiments, cooling elements 240 may be coupled to a common manifold that is also coupled to a base cooling aperture 214.

According to the alternative embodiment shown in FIG. 12, a turbine blade 300 includes a thermal regulation system originating from a base portion, shown as base portion 310. In some embodiments, base portion 310 includes a planar surface, shown as surface 312. According to an exemplary embodiment, turbine blade 300 includes a core element, shown as spine member 320 and a shell, shown as shell 330. As shown in FIG. 12, spine member 320 and shell 330 extend orthogonally from surface 312. In some embodiments, a void, shown as void 335, is defined by the volume between an inner surface of shell 330 and an outer surface of spine member 320.

Referring still to FIG. 12, base portion 310 defines an aperture, shown as base cooling aperture 314. According to an exemplary embodiment, spine member 320 is a tubular structure and includes at least one sidewall, shown as sidewall 322, that defines an inner void space, shown as flow path 324. As shown in FIG. 11, a root end of spine member 320 is coupled to base portion 310 and disposed over base cooling aperture 314.

According to an exemplary embodiment, turbine blade 300 includes a plurality of cooling elements, shown as cooling elements 340. As shown in FIG. 11, cooling elements 340 are positioned within void 335 and coupled to spine member 320 and shell 330. As shown in FIG. 12, shell 330 defines a plurality of apertures, shown as shell apertures 332, and spine member 320 defines a plurality of apertures, shown as spine apertures 326. According to an exemplary embodiment, cooling elements 340 are coupled to both shell 330 and spine member 320 and include ends disposed over shell apertures 332 and spine apertures 326.

In some embodiments, a fluid (e.g., air, another gas, a liquid, etc.) is flowed through base cooling aperture 314 (e.g., from within an aperture of a hub of the turbine blade assembly). The fluid may have a temperature that is controlled (i.e. regulated, monitored, cooled, etc.) to increase the maximum operating temperature of turbine blade 300. In some embodiments, the temperature of the fluid is selected (i.e. the fluid is provided at a specified temperature) to increase the maximum operating temperature of turbine blade 300 while preventing thermal stresses from fracturing one of the various elements of turbine blade 300 (e.g., due to a large disparity in temperature between shell 330 or spine member 320 and the fluid).

According to the exemplary embodiment shown in FIG. 12, the fluid may be flowed through base cooling aperture 314 and into flow path 324 within spine member 320. Thereafter, the fluid may flow through spine apertures 326, into cooling elements 340, and exit through shell apertures 332. According to an exemplary embodiment, the fluid forms a protective layer of air across an outer surface of shell 330. Such a protective layer may shield the outer surface of shell 330 and allow turbine blade 300 to function at a higher operating temperature. While a fluid flow through the cooling elements 340 of turbine blade 300 has been explicitly discussed, it should be understood that a fluid may be similarly routed through cooling elements 240 of turbine blade 200 as part of a thermal regulation system.

According to an alternative embodiment, spine member 320 and shell 330 define spine apertures 326 and shell apertures 332, respectively, and turbine blade 300 does not include cooling elements 340. The fluid may be flowed through base cooling aperture 314, into void 335, and out from shell 330 through shell apertures 332. Such an arrangement does not require cooling elements extending between shell apertures 332 and spine apertures 326. In some embodiments, the fluid may fill void 335 before flowing outward through shell apertures 332 (e.g., thereby absorbing thermal energy from shell 330 prior to flowing through shell apertures 332). In other embodiments, the fluid is not provided to at least a portion of void 335 (e.g., the fluid is flowed at high pressure through spine apertures 326 and corresponding shell apertures 332).

Referring next to the exemplary embodiment shown in FIG. 13, a turbine blade 400 includes a thermal regulation system originating from a base portion, shown as base portion 410. In some embodiments, base portion 410 includes a planar surface, shown as surface 412. According to an exemplary embodiment, turbine blade 400 includes a core element, shown as spine member 420 and a shell, shown as shell 430. As shown in FIG. 12, spine member 420 and shell 430 extend orthogonally from surface 412. In some embodiments, a void, shown as void 435, is defined by the volume between an inner surface of shell 430 and an outer surface of spine member 420.

According to the exemplary embodiment shown in FIG. 13, turbine blade 400 includes a plurality of cooling elements, shown as heat sinks 440. As shown in FIG. 12, heat sinks 440 are coupled to shell 430 of turbine blade 400. In other embodiments, heat sinks 440 may be coupled to spine member 420 and shell 430 or only to spine member 420. Where heat sinks 440 include a first end and a second end both coupled to at least one of spine member 420 and shell 430, heat sinks 440 may be placed under a pre-load tension. In embodiments where heat sinks 440 have a free end extending into void 435, a material may be disposed on the free end to limit degradation heat sinks 440.

According to an exemplary embodiment, heat sinks 440 comprise flexible fibers (e.g., carbon fibers, carbon nanotubes, boron nitride nanotubes, metallic fibers, etc.) that transfer heat from shell 430. In some embodiments, heat sinks 440 comprise nanotubes having chiralities designed to facilitate the transfer of thermal energy. According to an alternative embodiment, heat sinks 440 may be rigid structures or may have another shape (e.g., a fin shape, etc.).

As shown in FIG. 13, base portion 410 defines a plurality of apertures, shown as base aperture 414 and base aperture 416, that interface with void 435. According to an exemplary embodiment, a fluid may be flowed through base aperture 414 and base aperture 416 and into void 435 where it absorbs thermal energy from heat sinks 440. In some embodiments, the fluid thereafter flows through apertures defined within shell 430. The fluid may form a protective layer across an outer surface of shell 430 to shield shell 430 from high temperature gasses within a turbine engine. Such an arrangement of heat sinks 440 coupled to shell 430 may provide generalized cooling to shell 430 as the fluid absorbs energy from heat sinks 440 while providing localized cooling (e.g., as the fluid flows through apertures within shell 430) and a protective outer layer. In other embodiments, at least a portion of the fluid is directed back into base portion 410. Such a configuration of a thermal regulation system may allow for the fluid to be routed within void 435 and then reprocessed (e.g., reduce the temperature and again flow the fluid through void 435).

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of manufacturing a turbine blade, comprising:
providing a core element including a base portion, a tip portion, and an intermediate portion extending between the base portion and the tip portion, the intermediate portion having a non-uniform cross section and comprising a fiber material;
surrounding the core element with a shell, a volume between the core element and the shell forming a void;
positioning a structural element within the void, wherein the core element comprises a plurality of individual fibers, at least one of the plurality of individual fibers peeling off of the core element to form the structural element; and
engaging the core element and the shell with the structural element.

2. The method of claim 1, wherein the core element defines an outer surface extending along the intermediate portion.

3. The method of claim 2, wherein the shell includes an outer surface, an inner surface, and a wall, the inner surface and the outer surface disposed on opposite sides of the wall.

4. The method of claim 3, wherein the structural element extends from the outer surface of the core element to the inner surface of the shell.

5. The method of claim 1, further comprising constructing the core element from a first material.

6. The method of claim 5, wherein the first material is non-metallic.

7. The method of claim 6, wherein the core element comprises a plurality of individual fibers.

8. The method of claim 5, further comprising constructing the shell from a second material.

9. The method of claim 8, wherein the first material is non-metallic.

10. The method of claim 9, wherein the core element comprises a plurality of individual fibers.

11. The method of claim 8, wherein the second material is non-metallic.

12. The method of claim 8, wherein the second material is different than the first material.

13. The method of claim 8, wherein the second material is metallic.

14. The method of claim 1, further comprising providing a base member.

15. The method of claim 14, further comprising coupling the shell to the base member.

16. The method of claim 15, further comprising insulating the core element from a high temperature operating environment with the shell.

17. The method of claim 1, further comprising coupling the shell to the base portion of the core element.

18. The method of claim 17, further comprising coupling the shell to the tip portion of the core element.

19. The method of claim 1, wherein the shell includes an intake side and an exhaust side.

20. The method of claim 19, further comprising extending the structural element from the core element toward the intake side of the shell.

21. The method of claim 19, further comprising extending the structural element from the core element toward the exhaust side of the shell.

22. The method of claim 1, further comprising
extending a cooling element through the void, the cooling element configured to increase a maximum operating temperature at the turbine blade.

23. The method of claim 22, further comprising providing a fluid within the cooling element.

24. The method of claim 23, further comprising transferring energy from the turbine blade with the fluid.

25. The method of claim 23, further comprising transferring energy from the shell to the core element with the fluid.

26. The method of claim 23, further comprising transferring energy from the shell with the fluid.

27. The method of claim 22, wherein the cooling element includes a plurality of heat sinks extending into the void from the shell.

28. The method of claim 27, wherein the shell includes an outer surface, an inner surface, and a wall, the inner surface and the outer surface disposed on opposite sides of the wall.

29. The method of claim 2, further comprising coupling first ends of the plurality of heat sinks to the inner surface.

30. The method of claim 29, wherein second ends of the plurality of heat sinks comprise free ends configured to move relative to the first ends.

31. The method of claim 29, further comprising coupling second ends of the plurality of heat sinks to the core element.

* * * * *